(12) United States Patent
Haltiner, Jr. et al.

(10) Patent No.: US 7,144,644 B2
(45) Date of Patent: Dec. 5, 2006

(54) MASS FLOW METERING AIR SUPPLY FOR A SOLID-OXIDE FUEL CELL STACK

(75) Inventors: Karl J. Haltiner, Jr., Fairport, NY (US); Sean M. Kelly, Churchville, NY (US)

(73) Assignee: Delphi Technologies, Inc., Troy, MI (US)

( * ) Notice: Subject to any disclaimer, the term of this patent is extended or adjusted under 35 U.S.C. 154(b) by 521 days.

(21) Appl. No.: 10/178,825

(22) Filed: Jun. 24, 2002

(65) Prior Publication Data

US 2003/0235748 A1 Dec. 25, 2003

(51) Int. Cl.
*H01M 8/04* (2006.01)
*B60L 11/18* (2006.01)

(52) U.S. Cl. .................. 429/13; 429/22; 429/26; 180/65.3

(58) Field of Classification Search .............. 429/12, 429/13, 22, 26, 38, 34
See application file for complete search history.

(56) References Cited

U.S. PATENT DOCUMENTS

| | | | |
|---|---|---|---|
| 6,093,502 A | 7/2000 | Carlstrom, Jr. et al. | |
| 6,268,074 B1 * | 7/2001 | Siepierski et al. | 429/13 |
| 6,321,145 B1 | 11/2001 | Rajashekara | |
| 6,326,763 B1 | 12/2001 | King et al. | |
| 6,376,113 B1 | 4/2002 | Edlund et al. | |
| 6,423,896 B1 | 7/2002 | Keegan | |
| 6,455,185 B1 | 9/2002 | Bircann et al. | |
| 6,485,852 B1 | 11/2002 | Miller et al. | |
| 6,509,113 B1 | 1/2003 | Keegan | |
| 6,551,734 B1 | 4/2003 | Simpkins et al. | |
| 6,562,496 B1 | 5/2003 | Faville et al. | |
| 6,608,463 B1 | 8/2003 | Kelly et al. | |
| 6,613,468 B1 | 9/2003 | Simpkins et al. | |
| 6,613,469 B1 | 9/2003 | Keegan | |
| 6,627,339 B1 | 9/2003 | Haltiner, Jr. | |
| 6,630,264 B1 | 10/2003 | Haltiner, Jr. et al. | |
| 6,716,546 B1 * | 4/2004 | Oglesby et al. | 429/25 |
| 2002/0012826 A1 * | 1/2002 | Sohmer | 429/34 |
| 2002/0045080 A1 * | 4/2002 | Andou et al. | 429/20 |
| 2003/0203257 A1 * | 10/2003 | Keskula et al. | 429/25 |

OTHER PUBLICATIONS

EP Search Report dated Oct. 7, 2003, published with EP 1376725, Jan. 2, 2004.

* cited by examiner

*Primary Examiner*—Jonathan Crepeau
(74) *Attorney, Agent, or Firm*—Paul L. Marshall

(57) ABSTRACT

In a solid-oxide fuel cell assembly, at least one positive displacement air supply (PDAS) pump supplies at least a portion of the air required for various functional air streams through the assembly. Mass air flow through each PDAS pump is readily controlled to a predetermined flow by controlling the rotational speed of the pump, obviating the need for an MAF sensor and control valve. Preferably, each different air stream through the assembly is controlled by its own PDAS pump, sized for the required flow, allowing each to operate at its optimal pressure and thereby minimizing the parasitic electrical cost of providing air to the SOFC assembly.

14 Claims, 4 Drawing Sheets

MASS FLOW METERING AIR SUPPLY FOR A SOLID-OXIDE FUEL CELL STACK

TECHNICAL FIELD

The present invention relates to hydrogen/oxygen fuel cells having a solid-oxide electrolytic layer separating an anode layer from a cathode layer; more particularly, to fuel cell stack assemblies and systems comprising a plurality of individual cells wherein air is supplied by a single air supply pump; and most particularly, to such fuel cell assemblies and systems wherein the incoming air is split into two streams, one to supply a reformer/anode loop of the system and the other to supply the cathode air loop, each stream being supplied by an independent positive displacement air pump.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived from "reformed" hydrocarbons, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

For control purposes, it is important to know the total mass air flow into the assembly. In a typical prior art assembly, a high-volume air pump supplies air past at least one mass air flow (MAF) sensor which regulates an air control valve to provide a predetermined mass flow of air into one or more functional areas of the assembly and through the various subsystem branches. Where different flows are needed in different areas, additional MAF sensors and valves are required in parallel for each branch, adding significant cost and complexity to the assembly. Further, all air must be pumped at the highest pressure required by any one of the subassemblies, increasing parasitic energy consumption by the assembly.

It is a principal object of the present invention to simplify the construction and reduce the cost of a solid-oxide fuel cell assembly.

It is a further object of the present invention to reduce the parasitic energy consumption of such a solid oxide fuel cell assembly.

BRIEF DESCRIPTION OF THE INVENTION

Briefly described, in a solid-oxide fuel cell assembly, a positive displacement air supply (PDAS) pump supplies at least a portion of the air required. Mass air flow through a PDAS pump is readily controlled to a predetermined flow by controlling the rotational speed of the pump, obviating the need for an MAF sensor and control valve. Preferably, each different air stream through the assembly is controlled by its own PDAS pump, allowing each to operate at its optimal pressure, thereby minimizing the parasitic electrical cost of providing air to the SOFC assembly.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
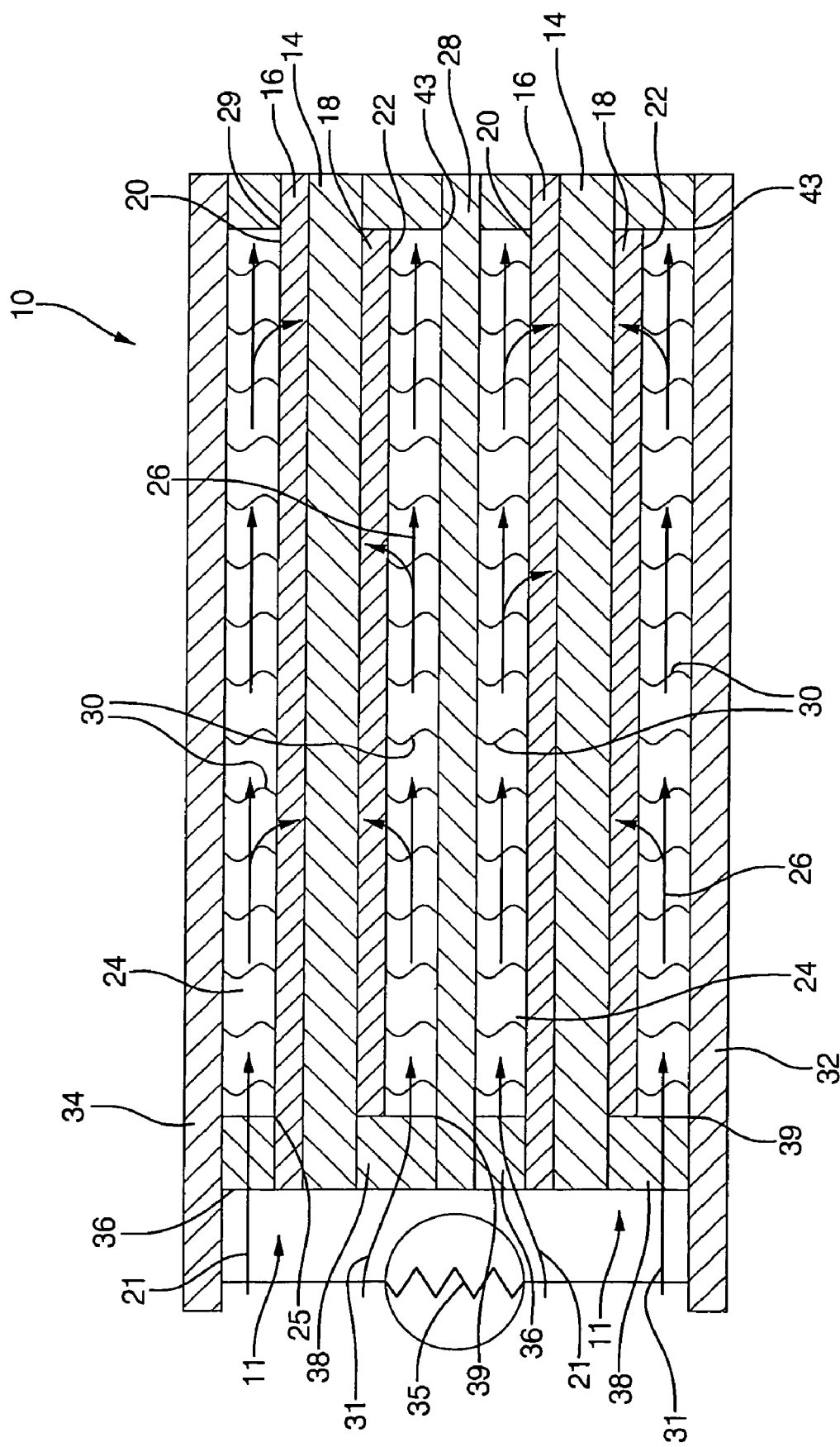
FIG. 1 is a schematic cross-sectional view of a two-cell stack of solid oxide fuel cells.

Referring to FIG. 1, a fuel cell stack 10 includes elements known in the art of solid oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of a first fuel cell 11 faces and is electrically connected to an interconnect 28 by filaments 30 extending across but not blocking passageway 24. Similarly, cathode 18 of a second fuel cell 11 faces and is electrically connected to interconnect 28 by filaments 30 extending across but not blocking passageway 26. Similarly, cathode 18 of the first fuel cell 11 faces and is electrically connected to a cathodic current collector 32 by filaments 30 extending across but not blocking passageway 26, and anode 16 of the second fuel cell 11 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells A and B are connected in series electrically between the two current collectors, and the total voltage and wattage between the current collectors is the sum of the voltage and wattage of the individual cells in a fuel cell stack.

Figure 2:
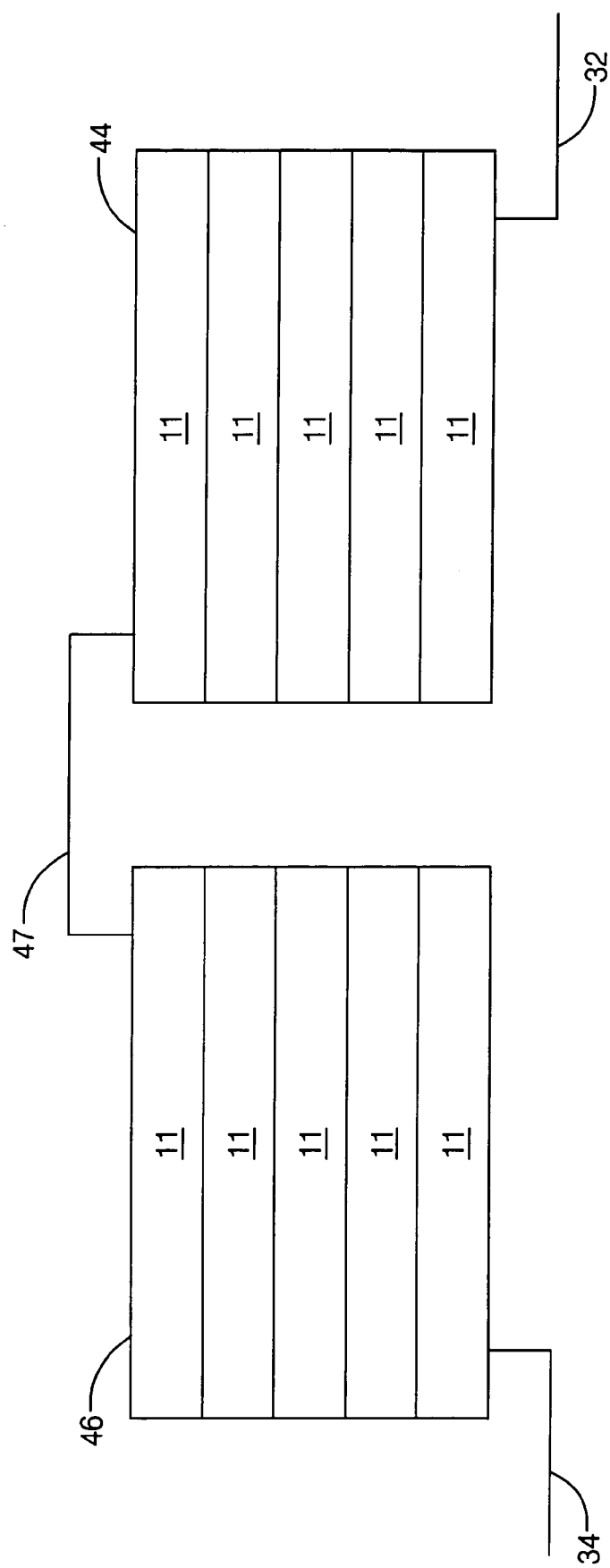
FIG. 2 is a schematic elevational view of two fuel cell stacks electrically connected in series.
Figure 5:
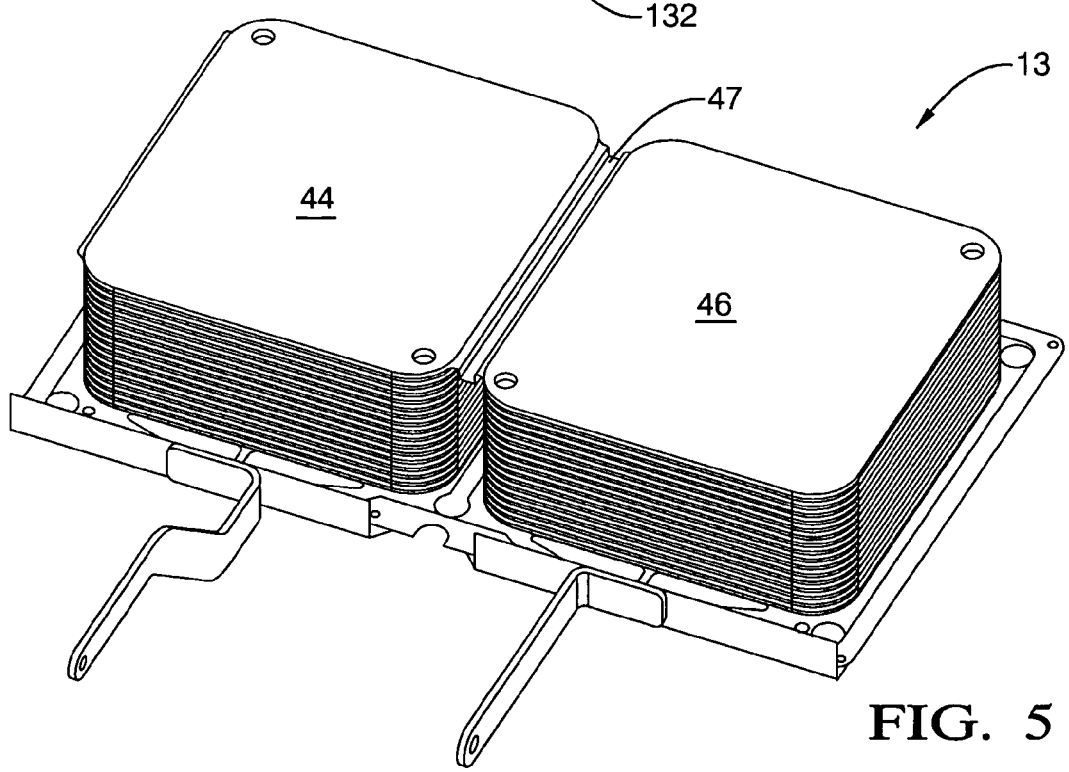
FIG. 5 is an isometric view of the fuel cell stacks shown in FIG. 2.

Referring to FIGS. 2 and 5, the cells 11 are arranged side-by-side rather than in overlapping arrangement as shown in FIG. 1. Further, the side-by-side arrangement may comprise a plurality of cells 11, respectively, such that each of first stack 44 and second stack 46 shown in FIG. 2 is a stack of identical fuel cells 11. The cells 11 in stack 44 and stack 46 are connected electrically in series by interconnect 47, and the stacks are connected in series.

Figure 3:
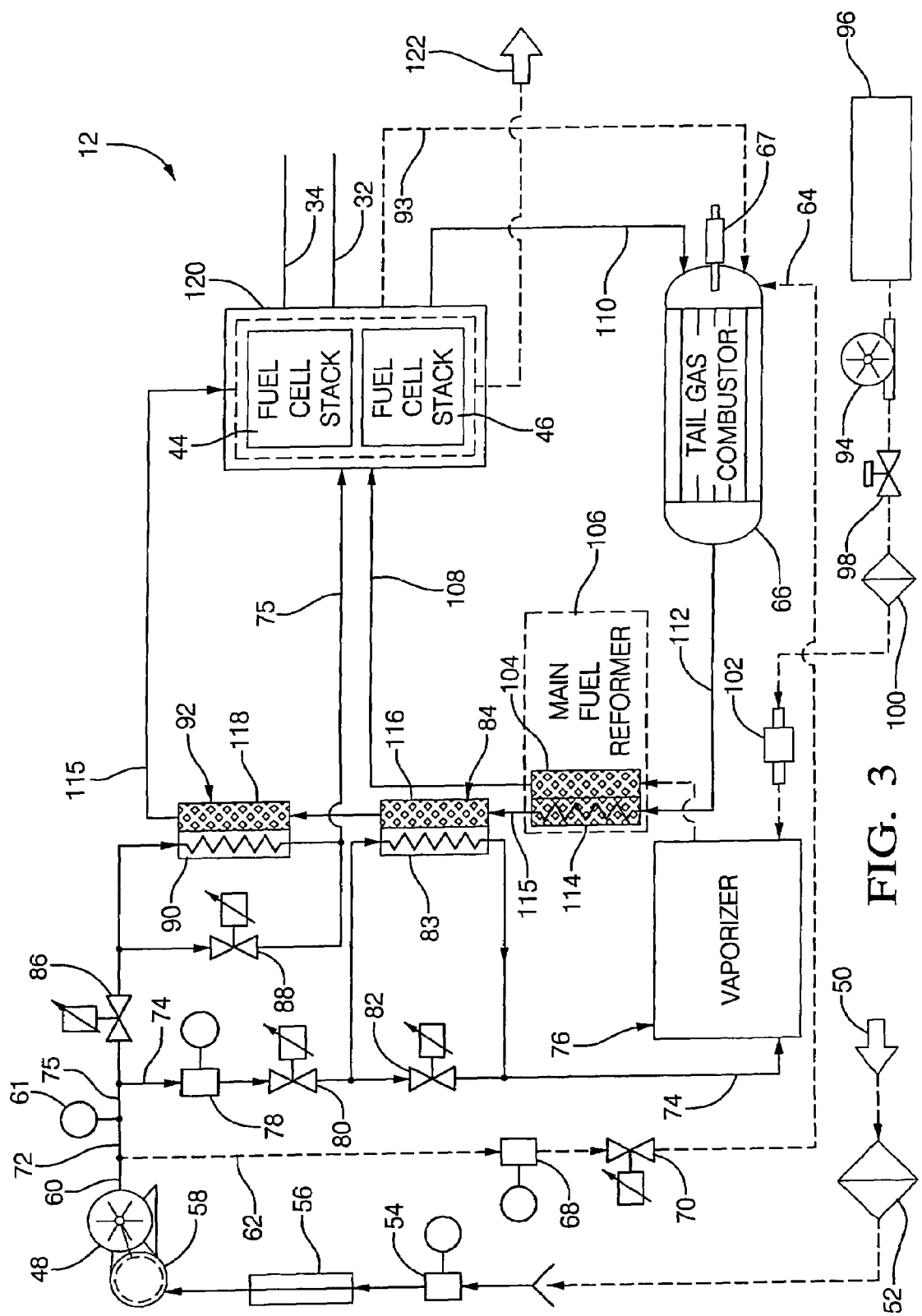
FIG. 3 is a schematic mechanization diagram of a typical SOFC assembly.

Referring to FIG. 3, the diagram of a solid-oxide fuel cell assembly 12 includes auxiliary equipment and controls for stacks 44,46 electrically connected as in FIG. 2.

A conventional high speed inlet air pump 48 draws inlet air 50 through an air filter 52, past a first MAF sensor 54, through a sonic silencer 56, and a cooling shroud 58 surrounding pump 48.

Air output 60 from pump 48, at a pressure sensed by pressure sensor 61, is first split into branched conduits between a feed 62 and a feed 72. Feed 62 goes as burner cooling air 64 to a stack afterburner 66 via a second MAF sensor 68 and a burner cool air control valve 70.

Feed 72 is further split into branched conduits between an anode air feed 74 and a cathode air feed 75. Anode feed 74 goes to a hydrocarbon fuel vaporizer 76 via a third MAF sensor 78 and reformer air control valve 80. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76.

Cathode air feed 75 is controlled by cathode air control valve 86 and may be controllably diverted by cathode air preheat bypass valve 88 through the cool side 90 of cathode air pre-heat heat exchanger 92 on its way to stacks 44,46. After passing through the cathode sides of the cells in stacks 44,46, the partially spent, heated air 93 is fed to burner 66.

A hydrocarbon fuel feed pump 94 draws fuel from a storage tank 96 and delivers the fuel via a pressure regulator 98 and filter 100 to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed to the anodes in stacks 44,46. Unconsumed fuel 110 from the anodes is fed to afterburner 66 where it is combined with air supplies 64 and 93 and is burned. The hot burner gases 112 are passed through a cleanup catalyst 114 in main reformer 106. The effluent 115 from catalyst 114 is passed through the hot sides 116,118 of heat exchangers 84, 92, respectively, to heat the incoming cathode and anode air. The partially-cooled effluent 115 is fed to a manifold 120 surrounding stacks 44,46 from whence it is eventually exhausted 122.

Figure 4:
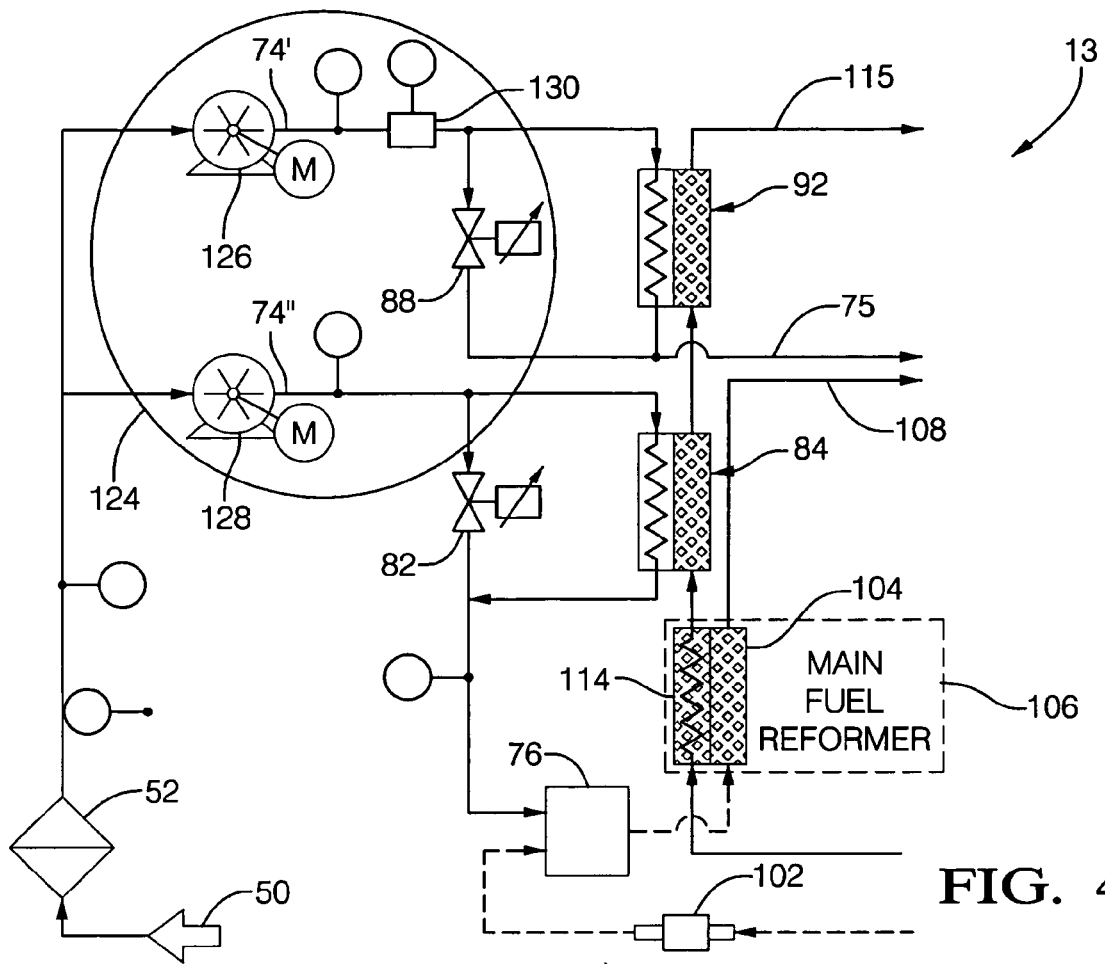
FIG. 4 is a portion of a mechanization diagram like FIG. 3, showing division of the air supply into a plurality of subsystems, each of which is supplied by a PDAS pump.

Referring to FIG. 4, the improvement conferred by the invention is highlighted by oval 124 (other assembly elements as shown in FIG. 3 are omitted for clarity but are assumed to be present). In a solid-oxide fuel cell assembly 13 in accordance with the invention, the single prior art air pump 48 and shroud 58 shown in FIG. 3 are replaced by a first positive displacement air pump 126, having a high output capacity for providing air to the high-volume cathode air functions via a first branched conduit 74', and a second positive displacement air pump 128, having a more modest output capacity for providing air to the low-volume anode air functions via a second branched conduit 74". Such pumps, wherein their rotational speed can be controlled to cause them to deliver a predetermined metered air flow, are known, for example, as "roots style microblowers". Other types of positive displacement pumps are vane or piston type. Gone also are the prior art first MAF sensor 54, second MAF sensor 68, and third MAF sensor 78. A single MAF sensor 130 may be employed optionally for control of the rotational speed, and hence output flow and pressure, of high-output pump 126. Also eliminated is silencer 56, as the two smaller blowers are less noisy in total than a single large high-capacity air pump. Further, in the prior art arrangement, the single blower supplies air to a central plenum (not shown on the schematic drawing) from which the individual branches depart, whereas the individual blowers feed into direct ducts without a plenum. A plenum is not suppressive of pump noise, whereas the individual ducts are excellent sound suppressors.

Of course, the use of only two such positive-displacement air pumps is only exemplary. The use of a larger plurality is within the scope of the invention; any number may be used in combination to meet additional gas-flow needs in any specific SOFC assembly, for example, to supply cooling air 64 to burner 66, as described above for the assembly shown in diagram 12 but not shown in exemplary FIG. 4.

An SOFC assembly in accordance with the invention is especially useful as an auxiliary power unit (APU) for vehicles 132 on which the APU may be mounted as shown in FIG. 4, such as cars and trucks, boats and ships, and airplanes, wherein motive power is supplied by a conventional engine and the auxiliary electrical power needs are met by the SOFC assembly.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly, comprising:
    a) a plurality of inlet air flow branched conduits including a first conduit defining a cathode air passageway and a second conduit defining a fuel vaporizer air passageway;
    b) at least one positive displacement air pump disposed in said first conduit; and
    c) at least one positive displacement air pump disposed in said second conduit.

2. A fuel cell assembly in accordance with claim 1 wherein each of said branched conduits includes a positive displacement air pump.

3. A fuel cell assembly in accordance with claim 1 wherein said plurality of conduits define passageways selected from the group consisting of cathode air, burner cooling air, and fuel vaporizer air.

4. A fuel cell assembly in accordance with claim 1 wherein said air pump is a roots-type blower.

5. A fuel cell assembly in accordance with claim 1 wherein said assembly is mounted on a vehicle.

6. A fuel cell assembly in accordance with claim 5 wherein said vehicle is selected from the group consisting of car, truck, boat, and airplane.

7. A fuel cell assembly in accordance with claim 6 wherein said assembly is an auxiliary power unit for said vehicle.

8. A fuel cell assembly in accordance with claim 1 wherein said fuel cell is a solid-oxide fuel cell.

9. An automotive vehicle, comprising a fuel cell assembly for generating an auxiliary power for said vehicle, the assembly including
    a plurality of inlet air flow branched conduits including a first conduit defining a cathode air passageway and a second conduit defining a fuel vaporizer air passageway,
    at least one positive displacement air pump disposed in said first conduit; and
    at least one positive displacement air pump disposed in said second conduit.

10. A method for providing a metered flow of air through a plurality of inlet air flow branched conduits in a fuel cell assembly, the plurality of inlet air flow branched conduits includes a first conduit defining a cathode air passageway and a second conduit defining a fuel vaporizer air passageway, comprising the steps of:
    a) providing a first positive displacement air supply pump in said first conduit;
    b) providing a second positive displacement air supply pump in said second conduit;
    c) controlling the rotational speed of said first air supply pump to cause the pump to deliver a predetermined metered flow of air through said first air conduit; and
    d) controlling the rotational speed of said second air supply pump to cause the pump to deliver a predetermined metered flow of air through said second air conduit.

11. A method in accordance with claim 10 wherein another one of said plurality of conduits defines an afterburner air passageway.

12. A fuel cell assembly in accordance with claim 1 wherein another one of said plurality of conduits defines an afterburner air passageway.

13. An automotive vehicle in accordance with claim 9 wherein another one of said plurality of conduits defines an afterburner air passageway.

14. A fuel cell assembly, comprising:
    a) a plurality of inlet air flow branched conduits including a first conduit defining a fuel vaporizer air passageway and a second conduit defining an afterburner cooling air passageway;
    b) at least one positive displacement air pump disposed in said first conduit; and
    c) at least one positive displacement air pump disposed in said second conduit.

* * * * *